United States Patent [19]

Hostetter

[11] Patent Number: 4,618,003
[45] Date of Patent: Oct. 21, 1986

[54] WEEDER-CULTIVATOR

[76] Inventor: John L. Hostetter, Rte. 3, Box 385A, Mountain Home, Ark. 72653

[21] Appl. No.: 708,551

[22] Filed: Mar. 5, 1985

[51] Int. Cl.⁴ .............................................. A01B 1/16
[52] U.S. Cl. .................................... 172/25; 172/372; 172/381; 30/310; 294/50.6
[58] Field of Search .................. 172/381, 25, 41, 744, 172/111; 294/50.6; 254/131.5, 132; 30/310; 175/382, 385, 398, 408

[56] References Cited

U.S. PATENT DOCUMENTS

| | | | |
|---|---|---|---|
| 743,445 | 11/1903 | Butler | 294/50.6 X |
| 799,359 | 9/1905 | Shaffer | 172/25 |
| 1,528,157 | 3/1925 | Leyden | 294/50.6 |
| 1,911,278 | 5/1933 | Hines | 172/14 |
| 2,082,476 | 6/1937 | Allen | 172/25 |
| 2,723,453 | 11/1955 | Espitallier | 172/518 |
| 3,129,771 | 4/1964 | Lidstone | 172/25 |
| 3,167,899 | 2/1965 | Best | 172/111 |
| 4,456,075 | 6/1984 | Hostetter | 172/381 |

FOREIGN PATENT DOCUMENTS

| | | | |
|---|---|---|---|
| 577620 | 6/1933 | Fed. Rep. of Germany | 175/385 |
| 86999 | 12/1920 | Switzerland | 172/25 |

Primary Examiner—Richard J. Johnson
Attorney, Agent, or Firm—Harvey B. Jacobson

[57] ABSTRACT

An elongated upstanding shank is provided including structure for manually applying rotary torque to the upper end of the shank. The lower end of the shank supports an elongated blade therefrom including a first horizontal upper end mounted at one end of the shank above the lower terminal end thereof for rotation with the shank. The first horizontal upper end of the blade extends outwardly from one side of the shank and terminates in a downwardly and inwardly curving portion which in turn terminates in a downwardly and inwardly inclined lower end portion of the blade. The downwardly and inwardly curving blade portion is slightly twisted about its longitudinal axis to position the lower terminal end of the blade lower end portion slightly outwardly of a second side of the shank facing outwardly in a direction disposed substantially 90° from the direction in which the first side of the shank faces outwardly. The lower end edge of the downwardly and inwardly inclined lower end portion of the blade is bevelled and defines an endwise outwardly opening notch having an angular extent of between 90° and 120°.

6 Claims, 6 Drawing Figures

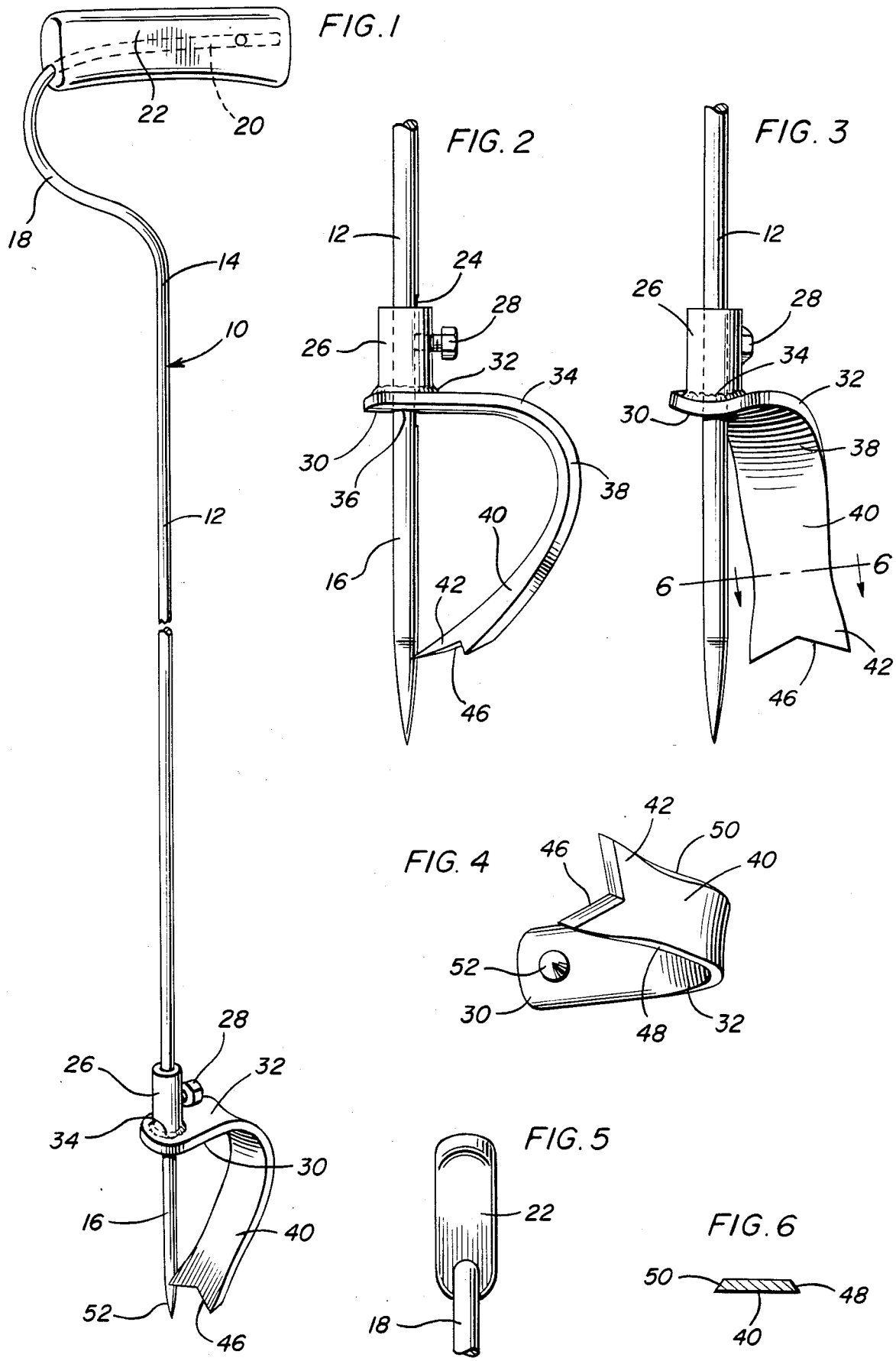

WEEDER-CULTIVATOR

BACKGROUND OF THE INVENTION

1. Field of the Invention

This invention relates to an earth working implement of the single throw lever, fulcrumed fork and sweep cutter type and is designed specifically for downwardly penetrating the ground and augering the latter in the area of the weed to be removed.

2. Description of Related Art

Various different forms of auger-type hand-operative weeders heretofore have been known such as those disclosed in U.S. Pat. Nos. 4,456,075, 4,112,902, 4,003,436, 3,548,953, 3,548,497, 3,552,850, 2,504,746, 1,947,785, 1,857,500, 1,842,903, 1,528,157, 1,142,783, 799,359, 445,621 and 128,150 as well as United Kingdom Pat. No. 842,871, Federal Republic of Germany Pat. No. 577,620 and Denmark Pat. No. 57,390.

SUMMARY OF THE INVENTION

The tool of the instant invention includes an elongated upstanding shank having a ground piercing lower end and an upper end including structure for applying manual rotary torque to the shank. The lower end of the shank supports a single elongated and rigid strap-type blade therefrom including a generally horizontal elongated upper end portion having a first end thereof mounted on the shank above the lower terminal end thereof for rotation with the shank and with the other end of the upper end portion of the blade projecting outwardly from one side of the shank. The outer end of the blade upper end portion curves downwardly and inwardly toward the shank and terminates downwardly in a generally straight and downwardly inclined lower end portion of the blade. The downwardly curving portion of the blade is slightly twisted about its longitudinal axis to position the lower terminal end of the lower end portion of the blade slightly outwardly of one side of the lower end of the shank and the lower terminal end of the blade lower end portion includes a sharpened endwise outwardly facing V-shaped transverse ground cutting edge.

The main object of this invention is to provide an improved manually operable weeder-cultivator which may be effectively used to remove lawn weeds and the like while at the same time cultivating the ground area immediately about the removed weed in preparation to seeding the ground area.

Another object of this invention is to provide a weeder-cultivator which may be effectively used with substantially no training or extensive instructions as to its use being required in order to perform the desired weeding and ground cultivating operation.

Still aother object of this invention is to provide a weeder-cultivator which may be effectively used in different types of ground for the removal of lawn weeds and the like.

A final object of this invention to be specifically enumerated herein is to provide a weeder-cultivator in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the weeder-cultivator with an intermediate height portion of the vertical shank thereof being broken away;

FIG. 2 is an enlarged side elevational view of the lower end portion of the weeder-cultivator;

FIG. 3 is an enlarged elevational view of the assemblage illustrated in FIG. 2 as seen from the left side thereof;

FIG. 4 is a bottom plan view of the weeder-cultivator;

FIG. 5 is a fragmentary end elevational view of the upper handle equipped end of the weeder-cultivator; and FIG. 6 is a horizontal sectional view taken substantially upon the plane indicated by the section line 6—6 of FIG. 3.

DESCRIPTION OF THE PREFERRED EMBODIMENT

Referring now more specifically to the drawings, the numeral 10 generally designates the weeder-cultivator assembly of the instant invention. The assembly 10 includes an upstanding shank 12 having upper and lower ends 14 and 16. The upper end 14 terminates upwardly in a reversely curving upper end portion 18 including a generally horizontal upper terminal end 20 upon which a formed handgrip 22 is mounted. The handgrip 22 is horizontally elongated and has its longitudinal center point substantially centered with respect to the longitudinal center line of that portion of the shank 12 disposed below the upper end portion 18.

The lower end 16 includes a longitudinally extending elongated flat area 24 on a first side thereof and a mounting sleeve 26 is snugly slidingly telescoped over the lower end 16 and is equipped with a threadingly mounted radial set screw 28 whose inner end bears against the flat area 24 in order to releasably retain the mounting sleeve 26 in adjusted shifted position along the lower end 16.

The mounting sleeve 26 has one end 30 of an elongated strap-type blade 32 secured thereacross by welding 34 and the end 30 is provided with an aperture 36 registered with the interior of the sleeve 26 and through which the lower end 16 is also snugly slidingly received. The horizontal end 30 of the blade 32 projects outwardly from the flat area equipped first side of the shank 12 and terminates outwardly in a downwardly and inwardly curved portion 38 which in turn terminates downwardly in a downwardly and inwardly inclined lower end portion 40 of the blade 32. In addition to curving downwardly and inwardly, the curved portion 38 is slightly twisted about its longitudinal center axis whereby the lower terminal end 42 of the lower end portion 40 is disposed to a second side of the lower end portion 16 angularly displaced less than 90° from the first flat equipped side. The lower terminal end 42 is equipped with a bevelled, and thus sharpened, endwise outwardly opening V-shaped transverse end edge 46 defining an endwise outwardly opening V-shaped notch defining an included angle of between 90° and 100°. In addition, the opposite side longitudinal edges of the lower end portion 40 are oppositely bevelled as at 48 and 50, see FIG. 6.

From FIG. 4 of the drawings, it will be seen that at least substantially all of the lower end portion 40 including the lower terminal end 42 is disposed within a 90° sector area having its apex coinciding with the longitudinal center line of the lower end 16. Thus, when the assembly 10 is rotated in a counterclockwise direction as viewed in FIG. 4 of the drawings, the lower end portion 40 will be operative to dig downward into the ground into which the lower pointed terminal end 52 of the lower end 16 has been thrust. Thus, if the lower terminal end 52 is thrust downward into the center of a lawn weed and the assembly 10 is rotated about the longitudinal axis of the shank 12, the ground area surrounding the center root of the lawn weed may be augered and cultivated to a depth equivalent to the vertical spacing between the cutting edge 46 and the upper horizontal end 30 of the blade 32.

The blade 32 is rigid and substantially non-flexive. Further, the upper horizontal end 30 of the blade 32 is slightly transversely arcuate so as to be upwardly concave and downwardly convex. The downwardly convex surfaces of the upper horizontal end 30 of the blade 32 insures that downward penetration of the lower terminal end of the blade 32 will be terminated at a depth substantially equal to the vertical spacing between the cutting edge 46 and the upper horizontal end 30 of the blade 32.

The height of the lower terminal end 42 and cutting edge 46 may be adjusted relative to the relative terminal end 52 by loosening the set screw 28, shifting the mounting sleeve 26 and then again tightening the set screw 28.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A combined weeding and cultivator tool assembly including an elongated shank having a ground piercing lower end and an upper end including structure for applying rotary torque to said shank, the lower end of said shank supporting only a single elongated rigid strap-type blade therefrom including a generally horizontal elongated upper end portion having a first end thereof mounted on said shank above the lower terminal end thereof for rotation with said shank and with the other end of said upper end portion projecting outwardly from one side of said shank, curving downwardly and inwardly toward said shank and terminating downwardly in a generally straight and downwardly inwardly inclined lower end portion of said blade, the downwardly curving other end of said upper end portion being slightly twisted about its longitudinal axis to angularly offset said inclined lower end portion and position the lower terminal end of said lower end portion slightly outward of a second side of the lower end of said shank angularly displaced less than 90° from said first side, said lower terminal end of said blade including a sharpened endwise outwardly facing transverse ground cutting edge facing in a direction generally paralleling a path tangent to said second side.

2. A combined weeding and cultivator tool assembly including an elongated upstanding shank having a ground piercing lower end and an upper end including structure for applying rotary torque to said shank, the lower end of said shank supporting only a single elongated rigid strap-type blade therefrom including a generally horizontal elongated upper end portion having a first end thereof mounted on said shank above the lower terminal end thereof for rotation with said shank and with the other end of said upper end portion projecting outwardly from one side of said shank, curving downwardly and inwardly toward said shank and terminating downwardly in a generally straight and downwardly inwardly inclined lower end portion of said blade, the downwardly curving other end of said upper end portion being slightly twisted about its longitudinal axis to position the lower terminal end of said lower end portion slightly outward of one side of the lower end of said shank, said lower terminal end of said blade including a sharpened endwise outwardly facing transverse ground cutting edge, said cutting edge comprising a V-shaped cutting edge opening endwise outwardly of said lower terminal end of said blade.

3. The assembly of claim 2 wherein said V-shaped cutting edge defines an included angle of between 90° and 120°.

4. The assembly of claim 2 including mounting means for said blade horizontally elongated upper end portion, said mounting means including a mounting sleeve snugly slidable on said shank lower end and including means releasably anchoring said sleeve in adjusted position on said shank lower end, said first end of said blade being welded across the lower end of said sleeve and having an aperture formed therein registered with the interior of said sleeve and through which said lower end of said shank is also slidingly received.

5. A combined weeding and cultivator tool assembly including an elongated upstanding shank having a ground piercing lower end and an upper end including structure for applying rotary torque to said shank, the lower end of said shank supporting only a single elongated rigid strap-type blade therefrom including a generally horizontal elongated upper end portion having a first end thereof mounted on said shank above the lower terminal end thereof for rotation with said shank and with the other end of said upper end portion projecting outwardly from one side of said shank, curving downwardly and inwardly toward said shank and terminating downwardly in a generally straight and downwardly inwardly inclined lower end portion of said blade, the downwardly curving other end of said upper end portion being slightly twisted about its longitudinal axis to position the lower terminal end of said lower end portion slightly outward od one side of the lower end of said shank, said lower terminal end of said blade including a sharpened endwise outwardly facing transverse ground cutting edge, said blade upper and portion being slightly transversely bowed and being upwardly concave and downward convex.

6. The assembly of claim 4 wherein said means releasably securing said sleeve in adjusted position on said shank includes a threaded generally radial set screw carried by said shank and including an inner end engageable with the latter.

* * * * *